United States Patent
Nakagawa (10) Patent No.: US 7,204,281 B2
(45) Date of Patent: Apr. 17, 2007

(54) STUDLESS TIRE WITH TREAD HAVING CIRCUMFERENTIAL PORTIONS, BLOCKS AND V SHAPED SIPES

(75) Inventor: Hiroyuki Nakagawa, Kobe (JP)

(73) Assignee: Sumitomo Rubber Industries, Ltd., Kobe-shi (JP)

(*) Notice: Subject to any disclaimer, the term of this patent is extended or adjusted under 35 U.S.C. 154(b) by 0 days.

(21) Appl. No.: 10/183,158

(22) Filed: Jun. 28, 2002

(65) Prior Publication Data

US 2003/0019555 A1 Jan. 30, 2003

(30) Foreign Application Priority Data

Jun. 29, 2001 (JP) .............................. 2001-199305

(51) Int. Cl.
*B60C 11/12* (2006.01)
(52) U.S. Cl. .......................... 152/209.18; 152/209.28; 152/DIG. 3
(58) Field of Classification Search ........... 152/209.18, 152/209.28, DIG. 3
See application file for complete search history.

(56) References Cited

U.S. PATENT DOCUMENTS 5,795,415 A * 8/1998 Campana et al. ...... 152/209.18
5,873,399 A * 2/1999 Ochi et al. ................ 152/209.2
6,026,875 A   2/2000 Diensthuber et al.

FOREIGN PATENT DOCUMENTS

| EP | 1090781 | * | 4/2001 |
| JP | 60255506 |   | 12/1985 |
| JP | 01101204 |   | 4/1989 |
| JP | 3-182814 | * | 8/1991 |
| JP | 05178032 |   | 7/1993 |
| JP | 06032118 |   | 2/1994 |
| JP | 06191227 |   | 7/1994 |
| JP | 6-247110 | * | 9/1994 |
| JP | 10-264609 | * | 10/1998 |
| JP | 2002-29225 | * | 1/2002 |

* cited by examiner

*Primary Examiner*—Steven D. Maki
(74) *Attorney, Agent, or Firm*—Birch, Stewart, Kolasch & Birch, LLP (57) ABSTRACT

A studless tire which is provided in the tread portion with one or more circumferential portions provided with V-shaped sipes, the total width of the one or more circumferential portions is in a range of from 10 to 25% of the tread width, each V-shaped sipe is composed of two parts extending from its vertex located in a central region of the circumferential portion, and the V-shaped sipes in each circumferential portion are oriented towards the same direction and arranged at intervals in the tire circumferential direction.

11 Claims, 7 Drawing Sheets

STUDLESS TIRE WITH TREAD HAVING CIRCUMFERENTIAL PORTIONS, BLOCKS AND V SHAPED SIPES

The present invention relates to a studless tire, more particularly to a tread pattern being capable of improving grip performance.

On the snowy/icy roads, four-wheel-drive and studless tires best match each other. In the four-wheel-drive vehicles, in comparison with the rear-wheel-drive vehicles and front-wheel-drive vehicles, great tractional force can be obtained. Therefore, the users are liable to have an illusion such that overall grip performance inclusive of traction and braking performance is excellent. In reality, however, with respect to the braking performance, there is no difference between the four-wheel-drive and rear-wheel-drive or front-wheel-drive because even in the two-wheel-drive vehicles, four wheels already function at the time of braking. In case of the four-wheel-drive vehicles, therefore, the braking performance is felt to be lower or insufficient contrary to the expectation. Therefore, there is a strong demand for a studless tire having braking performance enhanced more than traction performance in order to correspond to the expectation and also in view of safety running.

A principal object of the present invention is therefore to provide a studless tire, in which road grip especially on the icy road surface is improved.

Another object of the present invention is to provide a studless tire, in which the braking performance on the icy roads is enhanced while maintaining good traction performance.

According to the present invention, a studless tire comprises
a tread portion provided with one or more circumferential portions whose total width is in a range of from 10 to 25% of the tread width,
each circumferential portion provided with V-shaped sipes each composed of two parts extending from a vertex located in a central region of the circumferential portion,
the V-shaped sipes in each said circumferential portion arranged at intervals in the tire circumferential direction and oriented towards the same direction.

Embodiments of the present invention will now be described in detail in conjunction with the accompanying drawings.

In the drawings, studless tire 1 according to the present invention comprises a tread portion 2 comprising one or more circumferential portions 3 provided with V-shaped sipes 7. On the circumferential portion 3, provided are only the V-shaped sipes 7. Incidentally, a sipe means a cut or very fine groove having no substantial width or a width of less than 1.5 mm preferably less than 1.0 mm.

Figure 1:
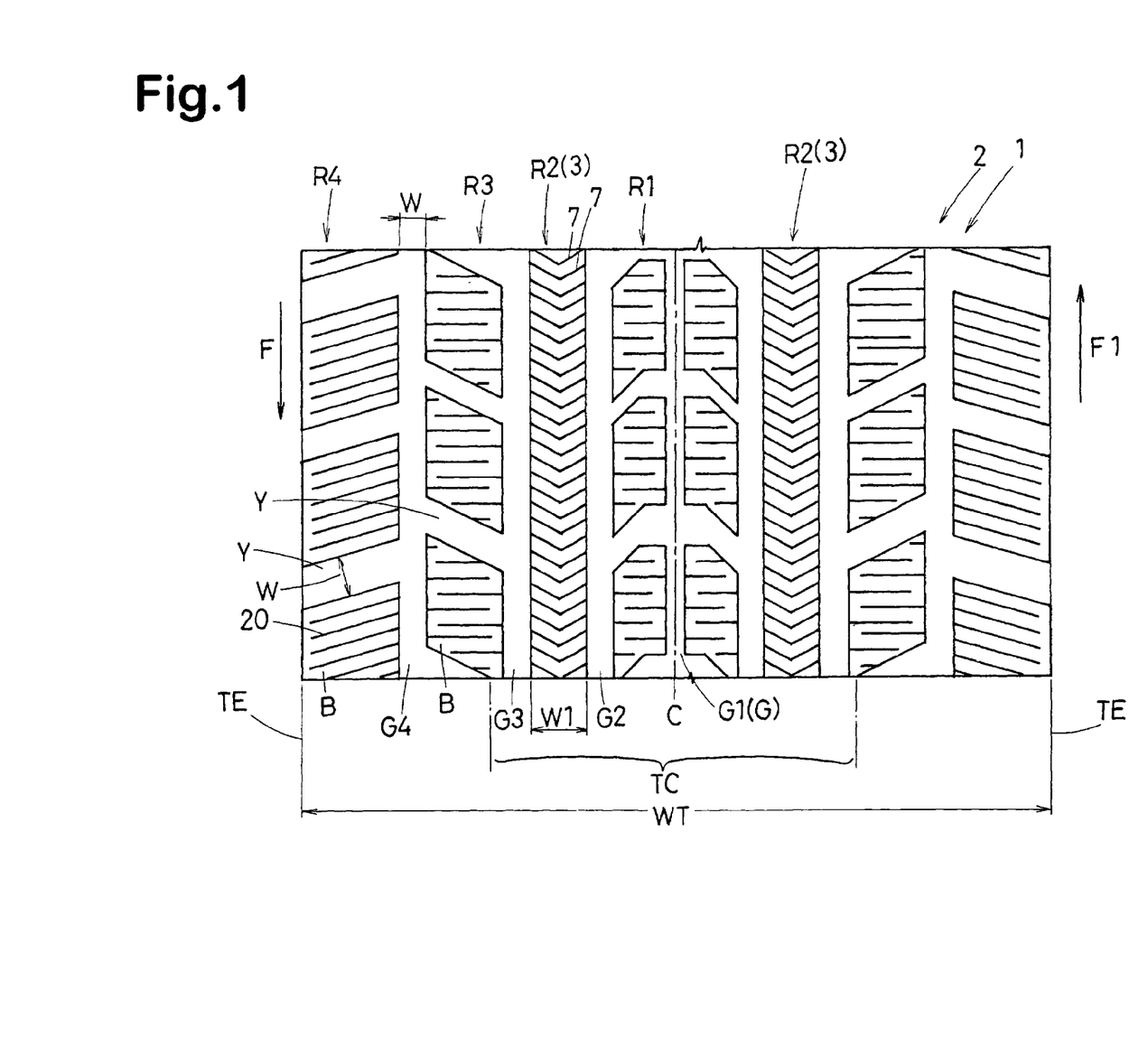
FIG. 1 is a developed partial plan view of a tire according to the present invention showing an example of the tread pattern.

In FIG. 1 which shows a pneumatic radial tire for four-wheel-drive vehicles as an embodiment of the present invention, the tread portion 2 is provided with seven circumferential grooves G including a first groove G1 on the tire equator c and second to fourth grooves G2, G3 and G4 on each side of the tire equator C. Thus, on each side of the tire equator C, the tread portion 2 is divided into first to fourth circumferential portions R1, R2, R3 and R4. The second circumferential portions R2 are the above-mentioned circumferential portion 3 provided with V-shaped sipes 7. Thus, each circumferential portion 3 is defined between two circumferential grooves G.

The V-shaped sipes 7 in this example have a width of about 0.3 mm. The V-shaped sipe 7 has a depth Ds of not more than the depth D of the adjacent circumferential groove G (G2, G3), preferably in a range of from 0.5 to 1.0 times the depth D.

The circumferential portion 3 is crossed by such sipes 7 only, not crossed by a wider groove for drainage. In this sense, the circumferential portion 3 extends substantially continuously in the tire circumferential direction.

The other circumferential portions R1, R3 and R4 are provided with axial grooves Y, and each portion is circumferentially divided into blocks B in a circumferential row. The axial grooves Y are arranged and inclined so as to form an unidirectional tread pattern.

For example, in case of passenger car tires, the circumferential grooves G and axial grooves Y are provided with a width W in a range of 5 to 25 mm and a depth D in a range of 8 to 15 mm. In this example, the circumferential grooves G and axial grooves Y have substantially same depths of about 12 mm.

Preferably, the total width $\Sigma W1$ of the circumferential portions 3 (in this example W1×2) is set in a range of from 10 to 25% of the tread width WT between the tread edges TE.

Each of the circumferential portions 3 in this example has a constant width W1, but the width W1 may be varied along the circumferential direction as far as the total width $\Sigma W1$ is in the above-mentioned range of from 10 to 25%.

The circumferential portions 3 in this example are formed as extending straight in the circumferential direction by dividing with the straight circumferential grooves G. But, it can be formed as being zigzag.

It is preferable that the circumferential portions 3 are disposed in a region where the ground pressure is relatively high, for example, in a tread central region TC having a width of 50% of the tread width WT and centered on the tire equator C. Usually, the circumferential portions 3 are disposed symmetrically about the tire equator C.

The above-mentioned V-shaped sipe 7 has a vertex Q and two oblique parts 6.

The vertex Q is disposed in a central region 3C of the circumferential portion 3. Here, the central region 3C is defined as ranging from its center line N in the tire axial direction to an axial distance L1 of 30% of the axial width W1 of the portion 3 towards each side of the center line N. In other words, the axial distance L2 between the vertex Q and the center line N is in a range of from 0 to 30% of the width W1.

The two oblique parts 6 extend in a V-shaped formation from the vertex Q to the side faces of the circumferential portion 3, while inclining towards the designed rotative direction F1 of the tire or the inverse direction to the traveling direction F in the ground contacting patch. The angle θ between the oblique parts 6 is preferably set in a range of from 90 to 140 degrees. Incidentally, the vertex Q is defined as the extreme end in the inverse direction F2 to the designed rotative direction F1.

The V-shaped sipe 7 therefore, extends across the overall width of the circumferential portion 3 and has open ends.

Figure 2:
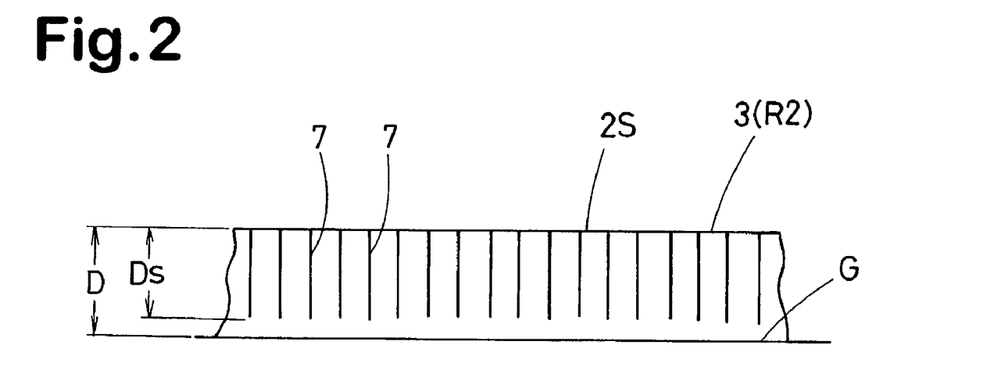
FIG. 2 is a longitudinal sectional view of a circumferential portion provided with V-shaped sipes.

In a longitudinal section of the circumferential portion 3, as shown in FIG. 2, the V-shaped sipes 7 are substantially normal to the tread face 2s.

The circumferential pitches Ps of the V-shaped sipes 7 are preferably set in a range of from 3.0 to 5.0 mm.

Figure 3:
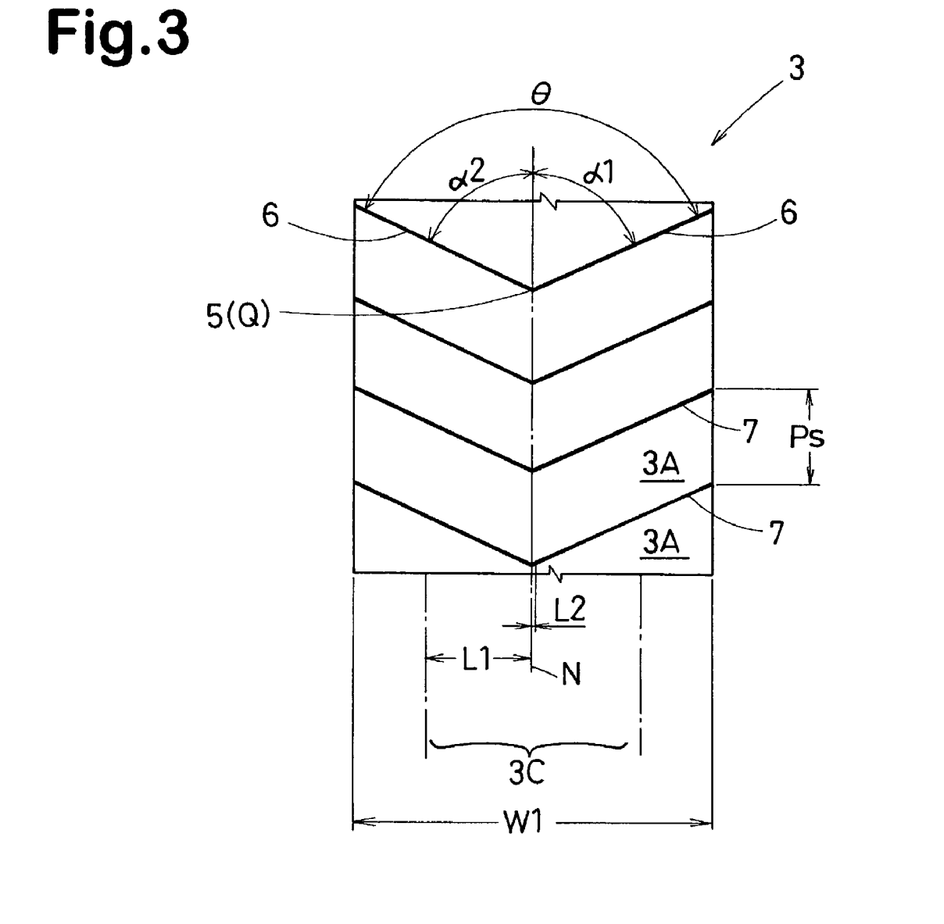
FIG. 3 is an enlarged partial plan view of the circumferential portion showing an arrangement of V-shaped sipes.

In FIG. 3, the V-shaped sipes 7 in each circumferential portion 3 are arranged at regular intervals in the tire circumferential direction. All the vertexes Q are disposed on the center line N. The oblique parts 6 extend straight from the vertex Q to the respective open ends. The oblique parts 6 of each V-shaped sipe 7 are inclined at the same angles α1 and α2 with respect to the circumferential direction. Each circumferential portion 3 is subdivided into a plurality of V-shaped elements 3A having a substantially constant thickness when measured in the tire circumferential direction.

Figure 4:
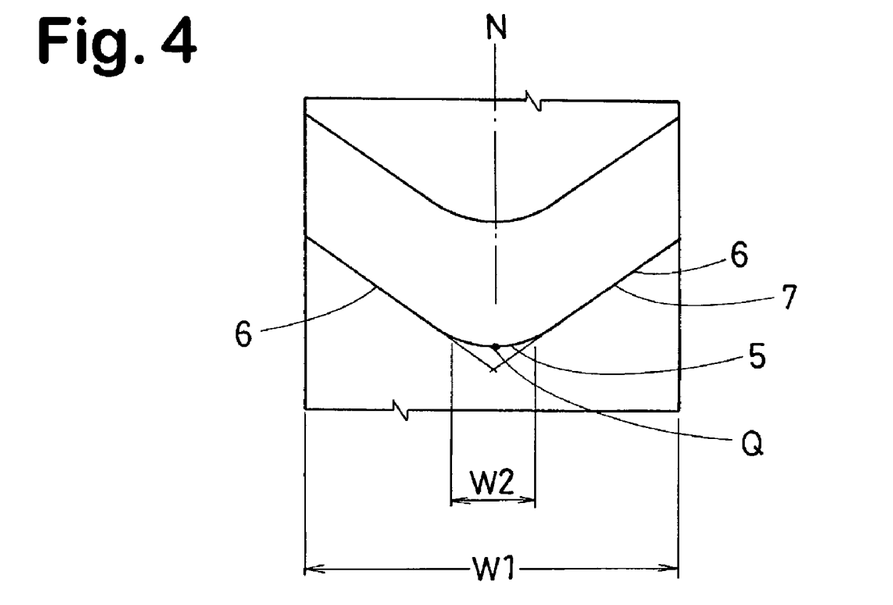
FIG. 4 shows another example of the V-shaped sipe.

FIG. 4 shows a modification of the above-mentioned V-shaped sipe 7, wherein a middle portion 5 near the vertex Q is defined by a curved line (in this example, an arc) connecting straight oblique parts 6. Thus, the sipe is bent gently contrary to the above-mentioned sharply bent V-shaped sipe 7.

In this case, it is preferable that the axial width W2 of the curved middle part 5 is limited to less than 20% of the width W1 of the circumferential portion 3 from a point of view of edge effect.

Figure 5:
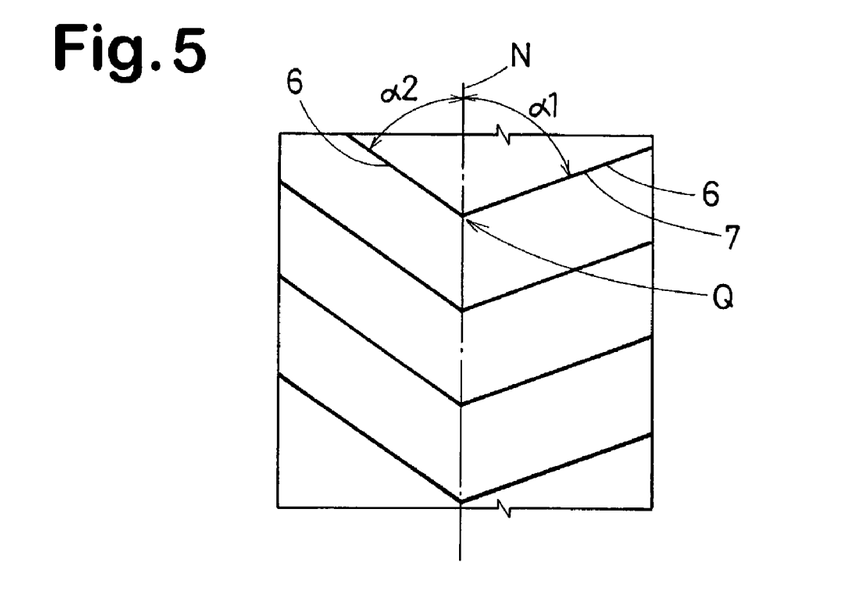
FIG. 5 shows another example of the V-shaped sipe.

FIG. 5 shows a modification of the V-shaped sipe shown in FIG. 3, wherein the oblique parts 6 are inclined at different angles α1 and α2, and the angle difference |α1−α2| is set in a range of from 10 to 30 degrees. If α1>α2, by the edge of the oblique parts 6 inclining at the smaller angle α2, a larger side force can be obtained, and the cornering performance may be improved, and as a result, high on-the-ice performance may be obtained overall.

Figure 6:
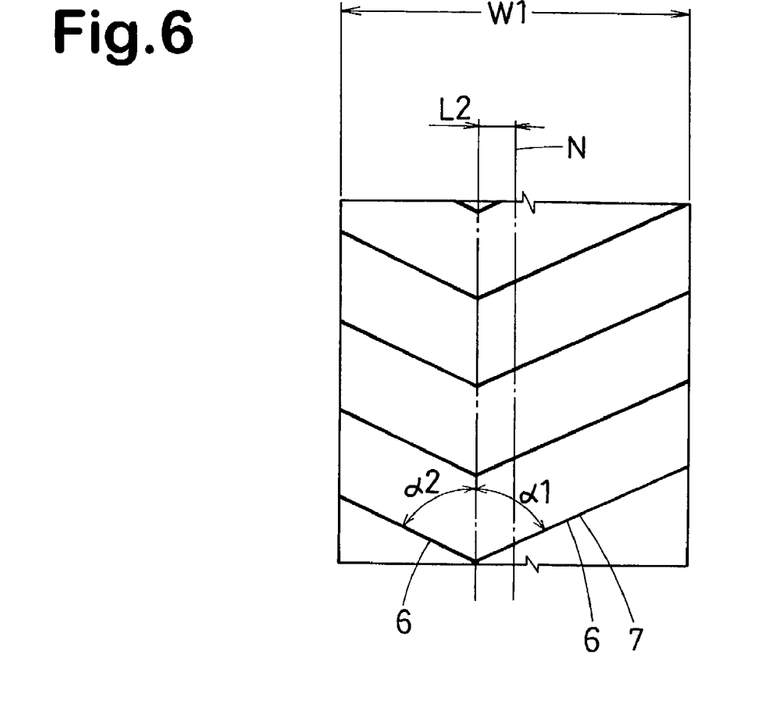
FIGS. 6 and 7 each show another arrangement of V-shaped sipes.

FIG. 6 show another arrangement of V-shaped sipes 7. In this example, the vertexes Q are set off from the center line N towards the same direction by a constant distance L2 which is within the above-mentioned range of not more than 0.3 times the width W1. Accordingly, the oblique parts 6 on one side of the vertexes Q become shorter than the oblique parts 6 on the other side of the vertexes Q.

Figure 7:
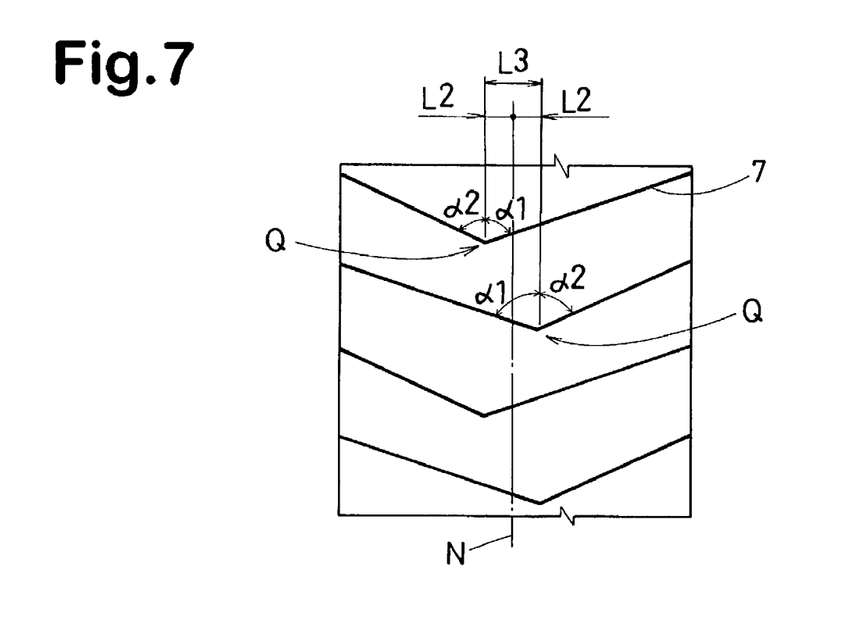

FIG. 7 shows still another example of the arrangement, wherein the vertexes Q are staggered about the center line N, while keeping each distance L2 within the above-mentioned range of not more than 0.3 times the width W1. In this case, it is preferable that the shift L3 between the vertexes Q is not more than 5.0 mm in the tire axial direction and all the distances L2 are the same. It may be possible to set the angle α1 larger than the angle α2 in order to equalize the rigidity.

In the remaining circumferential portions R1, R3 and R4 which are block rows in this embodiment, the blocks B may be provided with sipes such as a sipe which has a straight shape or a zigzag shape or a sipe having a zigzag central part and "open ends" or "closed ends" or "open end and closed end". In this embodiment, each block B is provided with a plurality of straight sipes 20 each having an open end and a closed end.

By arranging the V-shaped sipes 7 as above, the circumferential portion 3 divided by V-shaped sipes 7 may have directional rigidity.

Figure 8A:
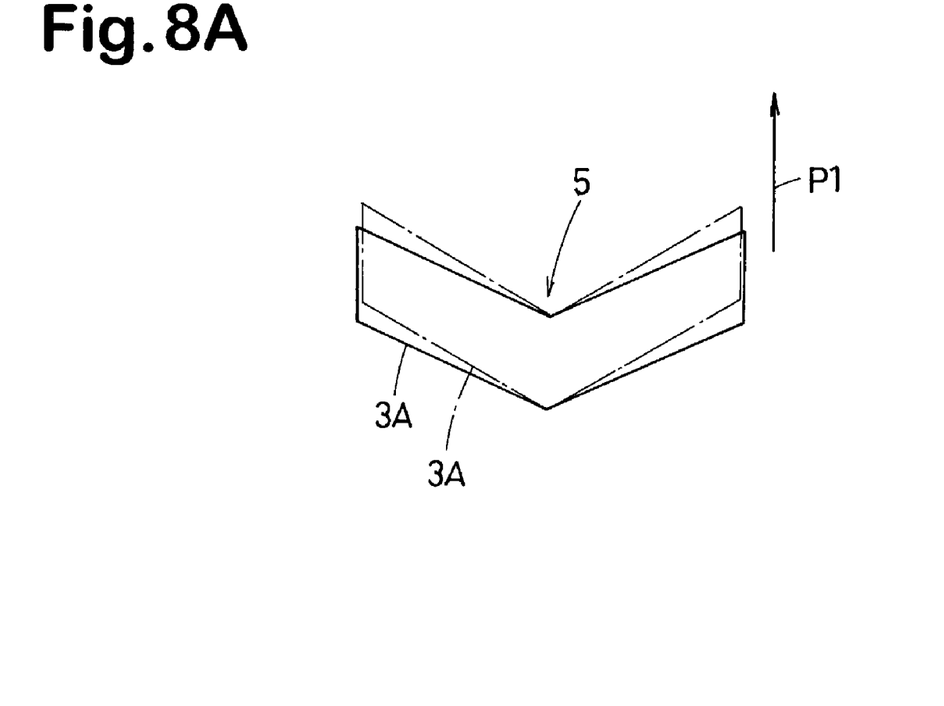
FIGS. 8A and 8B are diagrams for explaining deformation of the V-shaped element.

When the adjacent V-shaped elements 3A receive a force in a direction P1 from a road surface as shown in FIG. 8A, the element 3A is, as indicated by a chain line, deformed decreasing the angle of the V-shape. Such deformation can effectively control the leaning of the elements 3A. As a result, it becomes possible to derive the maximum edge effect from the elements 3A.

Figure 8B:
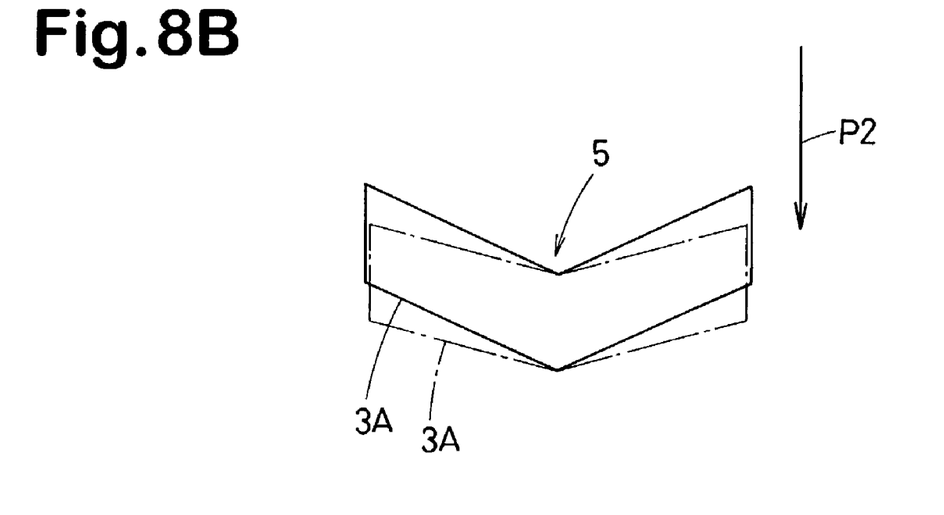
Figure 10:
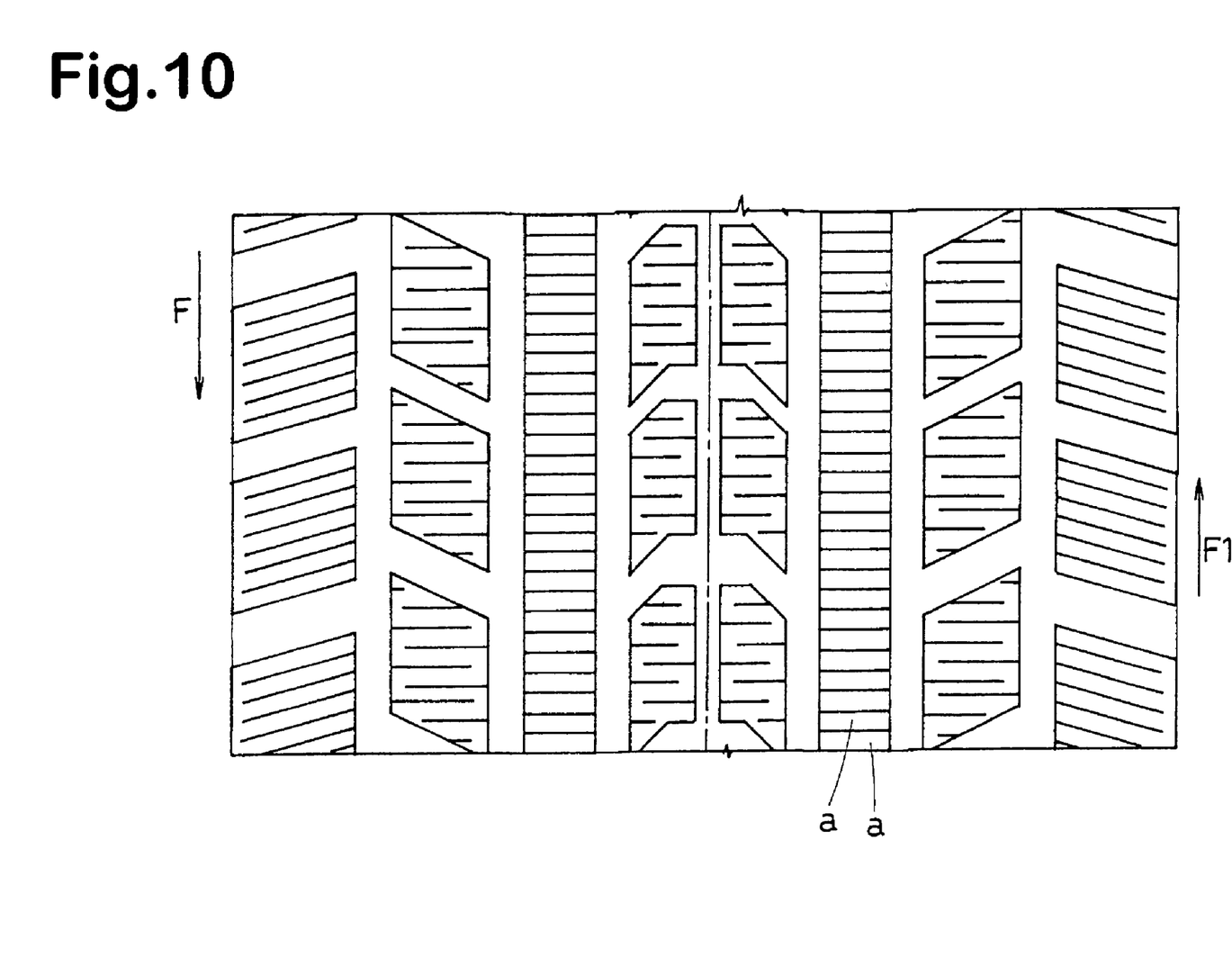
FIG. 10 shows a tread pattern used as reference tire Ref. 1 in the comparison tests.

On the other hand, as shown in FIG. 8B, when the V-shaped elements 3A receive a force in a direction P2 from a road surface, the element 3A is, as indicated by a chain line, deformed increasing the angle of the V-shape. As a result, the leaning of the elements 3A becomes larger than the above case shown in FIG. 8A, but smaller than that of rectangular elements such as shown in FIG. 10.

Therefore, the circumferential portion 3 as an aggregate of the V-shaped elements 3A displays a higher circumferential rigidity against a force in the direction P1 than the direction P2, thereby a higher grip can be obtained in the direction P1 than the direction P2, but in either direction, the grip is improved when compared with the rectangular elements.

In this embodiment, therefore, the V-shaped sipes are oriented so that the V-shaped elements 3A are subjected to a force in the direction P1 (FIG. 8A) at the time of braking. Accordingly, as requested in the four-wheel-drive vehicles, the braking performance on the icy road surface is enhanced while maintaining good traction performance.

If the angle θ between the oblique parts 6 is more than 140 degrees, the V-shaped elements 3A become liable to lean to the direction P1. If the angle θ is less than 90 degrees, the edges are greatly inclined to the circumferential direction. In either case, therefore, it becomes difficult to derive the maximum edge effect and the road grip performance (braking performance) can not be fully improved.

If the circumferential pitches Ps of the V-shaped sipes 7 is more than 5.0 mm, the number of the sipes decreases. If the circumferential pitches Ps is less than 3.0 mm, it becomes difficult to keep the necessary circumferential rigidity. In either case, the edge effect decreases and on-the-ice performance such as braking and traction performance is deteriorated.

If the total width ΣW1 of the circumferential portions 3 is more than 25% of the tread width WT, then the land ratio or positive ratio becomes too high and it becomes difficult to secure on-the-snow performance OR the adjacent blocks B becomes relatively small, and a relatively large difference is liable to occur in the pattern rigidity, and the cornering performance is liable to deteriorate. If the total width ΣW1 is less than 10% of the tread width WT, the axial component of the edges of the V-shaped sipes 7 becomes insufficient and on-the-ice performance deteriorates.

Figure 9:
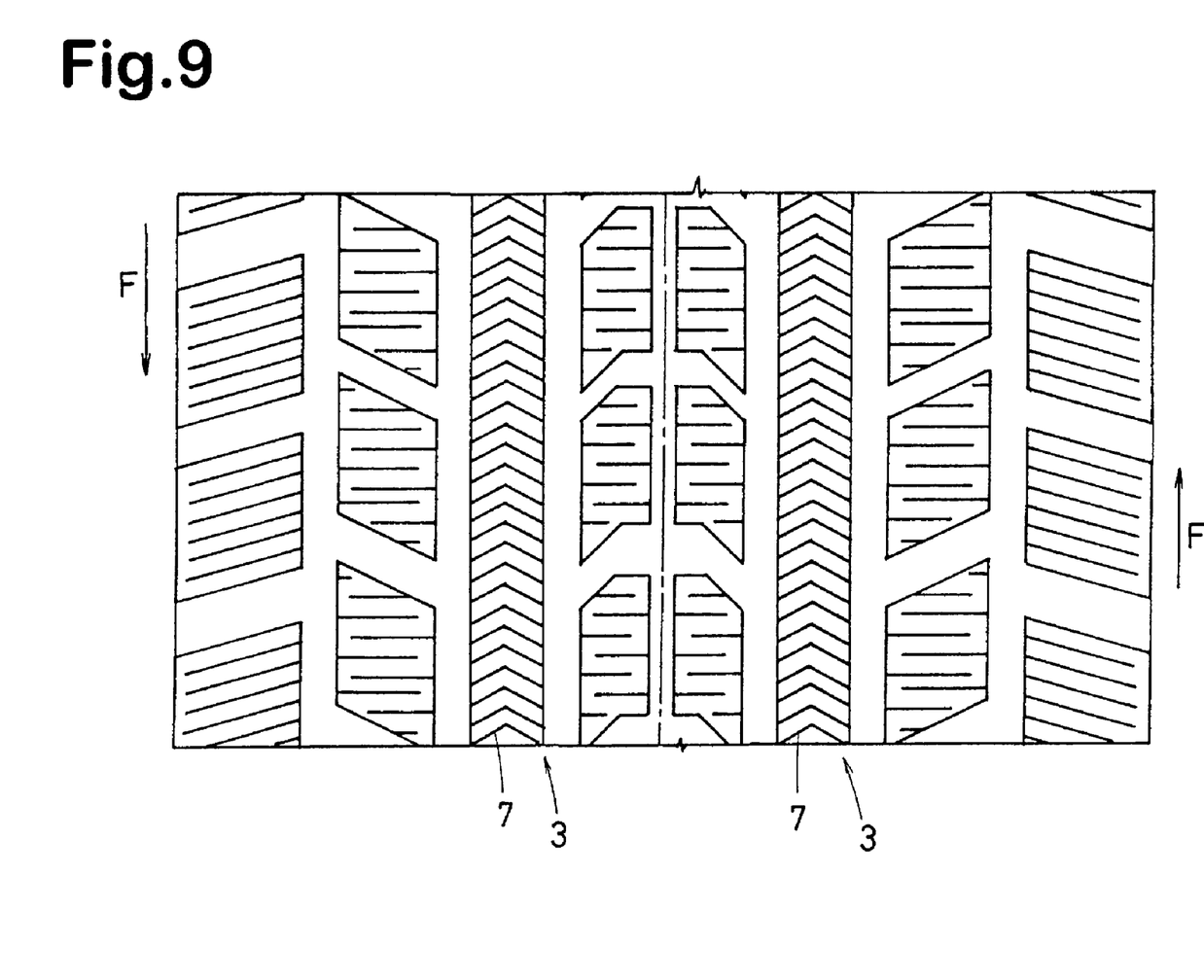
FIG. 9 shows another example of the tread pattern according to the present invention.

FIG. 9 shows another embodiment of the present invention, wherein the orientation direction of the V-shaped sipes 7 is reversed, otherwise the tread structure is the same as the above-mentioned embodiment shown in FIG. 1.

Comparison Tests

Studless tires of size 265/70R16 having specifications shown in Table 1 were made and tested for steering stability, traction, braking performance on icy road surface.

1) Traction Test

Using a 3400 cc 4-wheel-drive car provided on the four wheels with test tires, the shortest time necessary to advance 25 meters from zero speed was measured on icy road surface. (Rim size: 16×7J, Pressure: 200 kpa, Air temperature: 0 deg. C.) The results are indicated by an index based on Ref. 1 being 100, wherein the large the index number, the better the traction.

2) Braking Distance Test

On icy road surface, the braking distance when braking suddenly to lock the four wheels was measured at a running speed of 30 km/hr and the inverse of the braking distance is indicated in Table 1 by using an index based on Ref. 1 being 100, wherein the larger the index number, the better the braking performance.

3) Steering Stability Test

In a tire test course including icy road surface and snowy road surface, the test driver evaluated the steering stability into ten ranks based on running feeling during cornering, braking, and accelerating, wherein the larger the index number, the better the steering stability.

TABLE 1

| Tire | Ref. 1 | Ref. 2 | Ex. 1 | Ex. 2 | Ex. 3 | Ref. 3 | Ex. 4 | Ex. 5 | Ex. 6 | Ex. 7 | Ex. 8 |
|---|---|---|---|---|---|---|---|---|---|---|---|
| Tread pattern | FIG. 10 | FIG. 1 | FIG. 1 | FIG. 1 | FIG. 1 | FIG. 1 | FIG. 5 | FIG. 5 | FIG. 5 | FIG. 7 | FIG. 9 |
| Total width ΣW1/WT (%) | 20 | 5 | 10 | 20 | 25 | 30 | 20 | 20 | 20 | 20 | 20 |
| V-shaped sipe | *2 | | | | | | | | | | |
| Orientation *1 | — | N | N | N | N | N | N | N | N | N | R |
| Angle (deg.) | | | | | | | | | | | |
| θ | — | 130 | 130 | 130 | 130 | 130 | 135 | 130 | 130 | 120 | 130 |
| α1, α2 | 90, 90 | 65, 65 | 65, 65 | 65, 65 | 65, 65 | 65, 65 | 70, 65 | 70, 60 | 75, 55 | 60, 60 | 75,75 |
| Pitch Ps (mm) | — | 4.0 | 4.0 | 4.0 | 4.0 | 4.0 | 4.0 | 4.0 | 4.0 | 4.0 | 4.0 |
| Distance L2 (mm) | — | 0 | 0 | 0 | 0 | 0 | 0 | 0 | 0 | 3 | 0 |
| Shift L3 (mm) | — | 0 | 0 | 0 | 0 | 0 | 0 | 0 | 0 | 3 | 0 |
| Test Results | | | | | | | | | | | |
| Traction | 100 | 100 | 100 | 101 | 102 | 102 | 101 | 101 | 101 | 101 | 102 |
| Braking | 100 | 101 | 105 | 110 | 110 | 115 | 111 | 113 | 111 | 112 | 101 |
| Steering stability | 6 | 6 | 6 | 6 | 6 | 4 | 6 | 6.5 | 6.5 | 6 | 5.5 |

Tread width WT: 215 mm
*1 N: normal, R: reverse
*2 straight sipe

It was confirmed from the test results that the braking performance was enhanced in EX.1–EX.7 and EX.8 was enhanced in the traction performance.

The invention claimed is:

1. A studless tire comprising:
a tread portion provided with two circumferential portions, one on each side of the tire equator, whose total width is in a range of from 10 to 25% of the tread width, and circumferential rows of blocks circumferentially separated by axial grooves,
wherein each of said circumferential portions is provided with V-shaped sipes each composed of two parts extending from a vertex located in a central region of the circumferential portion,
wherein the V-shaped sipes in each said circumferential portion are oriented towards the same direction and arranged at intervals in the tire circumferential direction, and
in each said circumferential portion, the V-shaped sipes each extend across the overall width of the circumferential portion to have open ends, and except for said V-shaped sipes there is no groove extending across the overall width of the circumferential portion, and
the vertexes of the V-shaped sipes are disposed off the center line of the circumferential portion in the tire axial direction, wherein
the axial distance between each of said vertex and center line is in a range of not more than 30% of the axial width of the circumferential portion, and said vertexes are staggered about the center line.

2. The studless tire according to claim 1, wherein all of the V-shaped sipes in said two circumferential portions are oriented towards one circumferential direction.

3. The studless tire according to claim 1, wherein two circumferential grooves, which are disposed one on each side of each said circumferential portion to define the circumferential portions, are substantially straight grooves.

4. The studless tire according to claim 1, wherein the V-shaped sipe consists of said two parts, and an angle between the two parts is in a range of from 90 to 140 degrees.

5. The studless tire according to claim 1, wherein the sipes provided on the blocks are straight sipes.

6. A studless tire comprising:
a tread portion provided with two circumferential portions, one on each side of the tire equator, whose total width is in a range of from 10 to 25% of the tread width,
wherein each of said circumferential portions is provided with V-shaped sipes each having a width of less than 1.5 mm and each composed of two parts extending from a vertex located in a central region of the circumferential portion,
wherein the V-shaped sipes in each said circumferential portion are oriented towards the same direction and arranged at intervals in the tire circumferential direction, and
in each said circumferential portion, each of the V-shaped sipes extends across the overall width of the circumferential portion to have open ends, and except for said V-shaped sipes there is no groove extending across the overall width of the circumferential portion, and
wherein said tread portion is provided with a circumferential row of blocks between said two circumferential portions, and a circumferential row of blocks on the axial outside of each of said circumferential portions, wherein all the blocks are provided with sipes each having a width less than 1.5 mm, and the blocks in each circumferential row are circumferentially separated from each other by axial grooves, and said axial groove has a width of 5 to 25 mm,
wherein the vertexes of the V-shaped sipes in each said circumferential portion are disposed off the center line of the circumferential portion in the tire axial direction, and the axial distance between each said vertex and the center line is in a range of not more than 30 % of the axial width of the circumferential portion, and said vertexes are staggered about the center line.

7. The studless tire according to claim 6, wherein said two parts are inclined at different angles with respect to the circumferential direction of the tire.

8. The studless tire according to claim 6, wherein the blocks between said two circumferential portions are arranged in two circumferential rows.

9. The studless tire according to claim 6, wherein the blocks between said two circumferential portions are arranged in two circumferential rows, and a straight circumferential groove is disposed between said two circumferential rows.

10. The studless tire according to claim 6, wherein the blocks on the axial outside of each said circumferential portions are arranged in two circumferential rows.

11. The studless tire according to claim 6, wherein the blocks on the axial outside of each said circumferential portion are arranged in two circumferential rows, and a straight circumferential groove is disposed between said two circumferential rows.

* * * * *